(12) United States Patent
Hammar et al.

(10) Patent No.: US 10,857,677 B2
(45) Date of Patent: Dec. 8, 2020

(54) TIP ATTACHMENT TO AID IN PROGRAMMING A COLLABORATIVE ROBOT

(71) Applicant: Caterpillar Inc., Deerfield, IL (US)

(72) Inventors: Jeremy Hammar, Metamora, IL (US);
Craig Habeger, Chillicothe, IL (US);
Michael Noble, Peoria, IL (US);
William Barnickel, Metamora, IL (US);
Joshua Geary, Burley, ID (US)

(73) Assignee: Caterpillar Inc., Peoria, IL (US)

( * ) Notice: Subject to any disclaimer, the term of this patent is extended or adjusted under 35 U.S.C. 154(b) by 251 days.

(21) Appl. No.: 16/151,968

(22) Filed: Oct. 4, 2018

(65) Prior Publication Data

US 2020/0108508 A1 Apr. 9, 2020

(51) Int. Cl.
*B25J 11/00* (2006.01)
*B25J 9/16* (2006.01)
*G05B 19/402* (2006.01)
*B25J 9/00* (2006.01)

(52) U.S. Cl.
CPC .......... *B25J 11/005* (2013.01); *B25J 9/0009* (2013.01); *B25J 9/1664* (2013.01); *G05B 19/402* (2013.01); *G05B 2219/40269* (2013.01); *G05B 2219/45104* (2013.01)

(58) Field of Classification Search
CPC .... B25J 19/0029; B25J 11/005; B25J 19/063; B25J 9/0009; B25J 9/1664; B25J 15/04; B25J 19/0041; B25J 9/0081; G05B 19/402; G05B 2219/40269; G05B 2219/45104; G05B 2219/39055

USPC .......................................................... 33/502
See application file for complete search history.

(56) References Cited

U.S. PATENT DOCUMENTS

| | | | | |
|---|---|---|---|---|
| 4,514,616 A | * | 4/1985 | Warner | B25J 19/063 219/136 |
| 5,837,967 A | * | 11/1998 | Sperling | B23K 9/287 219/125.1 |
| 6,103,183 A | | 8/2000 | Brown | |
| 6,346,751 B1 | * | 2/2002 | Delfino | B25J 19/063 307/119 |
| 8,845,338 B2 | * | 9/2014 | Sirkett | B25J 15/04 439/15 |
| 8,992,113 B2 | * | 3/2015 | Campagna | B25J 15/04 403/349 |
| 10,265,867 B2 | * | 4/2019 | Kachline | B23K 37/0241 |
| 10,632,624 B2 | * | 4/2020 | Basit | B25J 19/063 |
| 2008/0146064 A1 | * | 6/2008 | Bankstahl | H01R 4/54 439/332 |
| 2008/0188093 A1 | * | 8/2008 | Jaeger | H01R 35/04 439/13 |
| 2014/0374399 A1 | * | 12/2014 | Kachline | B25J 19/00 219/137.9 |

(Continued)

*Primary Examiner* — Yaritza Guadalupe-McCall
(74) *Attorney, Agent, or Firm* — Harrity & Harrity LLP (57) ABSTRACT

A tip attachment is disclosed. The tip attachment may an attachment body including a recess to fit on or in a tip of a device during programming of a robotic device. The attachment body may be structured such that the attachment body defines a set of angles of the tip during the programming of the robotic device. The recess may be sized such that the recess defines a distance between the tip and a workpiece during the programming of the robotic device.

20 Claims, 7 Drawing Sheets

(56) References Cited

U.S. PATENT DOCUMENTS

| | | | |
|---|---|---|---|
| 2016/0101518 A1* | 4/2016 | Saito | B25J 9/0009 |
| | | | 74/490.03 |
| 2016/0228972 A1* | 8/2016 | Jogdand | B23K 9/323 |
| 2017/0187158 A1* | 6/2017 | Crowe | H05H 1/34 |
| 2018/0029238 A1* | 2/2018 | Basit | B25J 13/085 |
| 2019/0118285 A1* | 4/2019 | Ma | B23K 9/173 |
| 2019/0329428 A1* | 10/2019 | Sakurai | B25J 18/00 |
| 2019/0337082 A1* | 11/2019 | Sakurai | B23K 9/1274 |
| 2020/0094343 A1* | 3/2020 | Bhakuni | B23K 9/32 |
| 2020/0108508 A1* | 4/2020 | Hammar | B25J 11/005 |

\* cited by examiner

TIP ATTACHMENT TO AID IN PROGRAMMING A COLLABORATIVE ROBOT

TECHNICAL FIELD

The present disclosure relates generally to programming a collaborative robot and, more particularly, to a tip attachment to aid in programming a collaborative robot.

BACKGROUND

A collaborative robot (herein referred to as a cobot) is a robot intended to operate in proximity to and/or physically interact with humans in a shared workspace. A cobot, like other robots, is typically programmed using a teach pendant. However, programming a cobot using a teach pendant can be difficult and inefficient. For example, in the case of a cobot that can move and/or rotate with respect to multiple, differently oriented axes (e.g., a six-axis cobot arm), a user of the teach pendant may need to determine orientation of one or more of the cobot axes relative to a direction in which the cobot is to move, rotate, and/or the like, in order to put the cobot arm in a desired position. As such, programming the cobot using the teach pendant can be difficult and time consuming. In some cases, the teach pendant can be configured with software that assists in the positioning of the cobot during programming, but this software may be cobot-specific and/or undesirably expensive to develop or acquire.

Another technique that can be used to program a cobot is programming in a so-called free-drive mode. The free-drive mode is a programming mode that allows the cobot to be moved into a desired position by hand (e.g., rather than by control of the teach pendant), after which the position is learned by the cobot. Programming the cobot in the free-drive mode is simpler and faster as compared to programming using the teach pendant. However, programming the cobot in the in free-drive mode may lead to comparatively less accurate positional programming. In some cases, it may be possible to use a combination of free-drive programming and teach pendant programming (e.g., by positioning the cobot roughly into place and then using the teach pendant fine tune the positioning). However, this approach is time consuming and inefficient.

Accurate positioning of the cobot during programming is an important concern when the cobot is to be used in an application that requires accurate angle and/or distance control, such as a welding application (e.g., an application in which a welding torch is to be moved and controlled by the cobot in association with performing a weld on a workpiece).

One attempt to regulate distance and angulation of a torch nozzle relative to a workpiece is disclosed in U.S. Pat. No. 6,103,183 that issued to Brown on Aug. 15, 2000 ("the '183 patent"). In particular, the '183 patent discloses a supporting guide for an oxyacetylene torch that provides a body having spaced legs defining a recess therebetween to carry gas supply pipes of the torch for releasable attachment of the supporting guide to the supply pipes. Further, a body portion distal from the recess pivotally carries a disk carrying a support arm extending spacedly therefrom for pivotal motion relative to the body to support the torch and guide it on a workpiece or a template. In the '183 patent, the support arm is carried by the disk for adjustable extension and angulation relative to the body to regulate the distance of a torch nozzle from a workpiece and the angulation of the torch nozzle relative to the workpiece.

While the supporting guide of the '183 patent may provide some regulation of distance and angulation of a torch nozzle relative to a workpiece, the supporting guide described by the '183 patent is not practical for use in association with programming a cobot. For example, the supporting guide of the '183 patent requires manual manipulation of components of the supporting guide in order to provide distance and angle regulation. As described above, due to the nature of the manipulation of the supporting guide being human-controlled, sufficiently accurate positioning and/or guidance may not be achieved when configuring the supporting guide. As another example, since the supporting guide of the '183 patent is fitted around supply lines of the torch, use of the supporting guide when programming the cobot may be impractical or even impossible (e.g., due to a manner in which the torch needs to attach to the cobot).

The tip attachment of the present disclosure solves one or more of the problems set forth above and/or other problems in the art.

SUMMARY

According to some implementations, the present disclosure is related to a torch attachment, comprising: an attachment body including a recess that fits on or in a tip of a torch during programming of a collaborative robot, wherein a structure of the attachment body defines a set of angles of the tip during the programming of the collaborative robot, and wherein a dimension of the recess defines a distance between the tip and a workpiece during the programming of the collaborative robot.

According to some implementations, the present disclosure is related to a tip attachment, comprising: an attachment body including a recess to fit on or in a tip of a device during programming of a robotic device, wherein the attachment body is structured such that the attachment body defines a set of angles of the tip during the programming of the robotic device, and wherein the recess is sized such that the recess defines a distance between the tip and a workpiece during the programming of the robotic device.

According to some implementations, the present disclosure is related to a system, comprising: a robotic device; a device associated with performing an operation on a workpiece, wherein the robotic device is to position a tip of the device during a performance of the operation on the workpiece; and a tip attachment, attached to the tip of the device, comprising an attachment body with a recess that fits on or in the tip of the device, wherein a structure of the attachment body defines a set of angles of the tip during programming of the robotic device to perform the operation, and wherein a dimension of the recess defines a distance between the tip and the workpiece during the programming of the robotic device to perform the operation.

DETAILED DESCRIPTION

Figure 1:
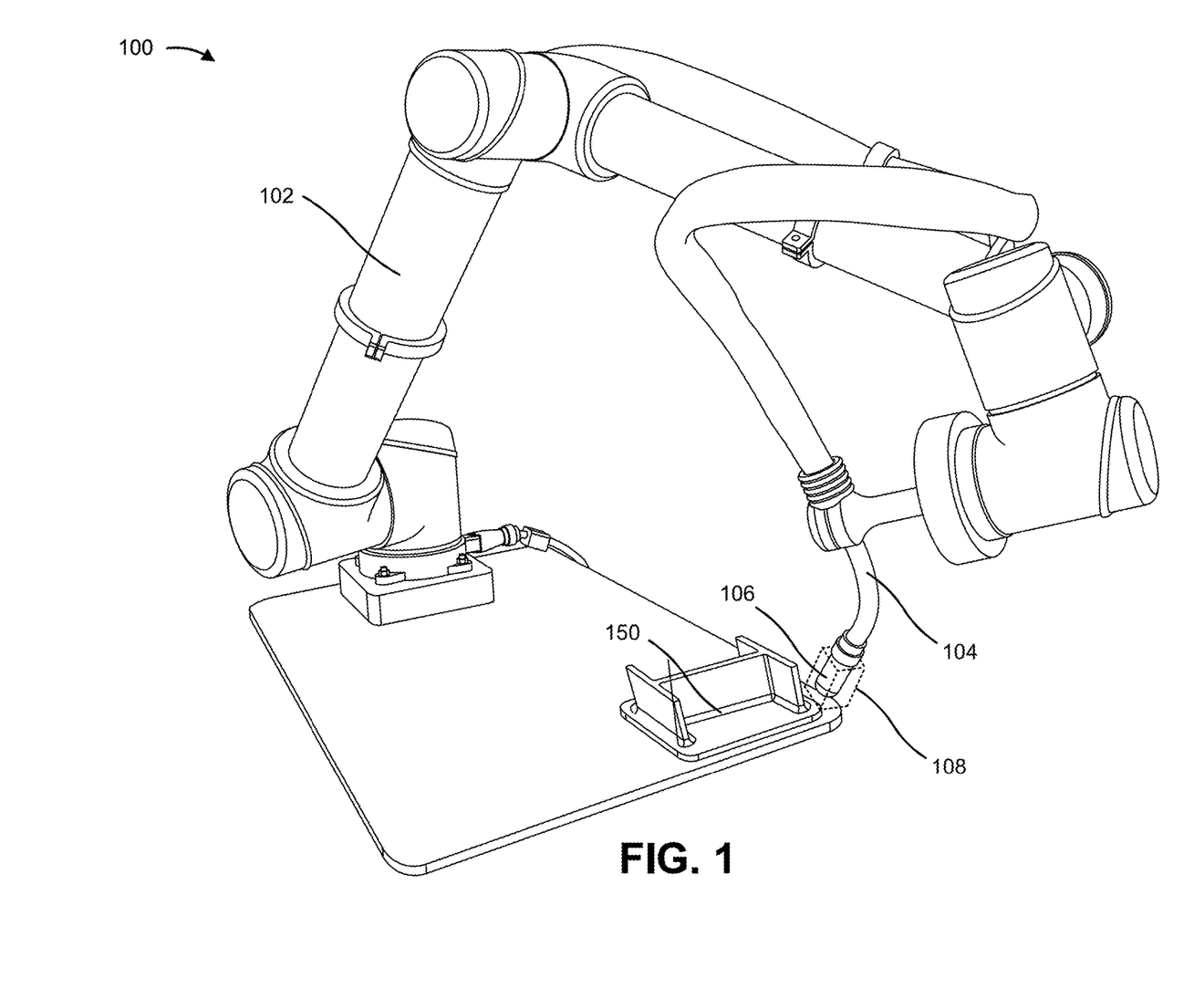
FIG. 1 is a diagram of an example system including a tip attachment associated with programming cobot, as described herein.

FIG. 1 is a diagram of an example system 100 including a tip attachment associated with programming a cobot, as described herein. As shown in FIG. 1, system 100 may include a cobot 102 and a controlled device 104. As shown, the controlled device 104 may have a tip 106 on or within which a tip attachment 108 is attached.

Cobot 102 is a robotic device that is capable of controlling (e.g., moving, rotating, or otherwise manipulating) controlled device 104 in association with positioning tip 106 of controlled device 104. For example, cobot 102 can include a multi-axis robotic arm (e.g., a six-axis arm is shown in FIG. 1), to which controlled device 104 is attached such that cobot 102 can control controlled device 104 in order to position tip 106 relative to a workpiece 150 (e.g., a workpiece on which controlled device 104 is to perform an operation using tip 106). Notably, while the implementations described herein are described in the context of a cobot 102, the tip attachment can be used in association with programming any other type of robotic device that is to control controlled device 104 in order to position tip 106 during operation on workpiece 150.

In some implementations, cobot 102 can be programmed in a free-drive mode that allows cobot 102 to be moved into a desired position by hand (e.g., rather than by control of a teach pendant). As described herein, when tip attachment 108 is attached to tip 106, a positional accuracy of tip 106 (e.g., in terms of a work angle of tip 106, a travel angle of tip 106, a distance from tip 106 to workpiece 150, and/or the like) is improved during programming the free-drive mode (e.g., as compared to free-drive mode programming without use of tip attachment 108).

Controlled device 104 is a device, including tip 106, that is capable of performing an operation on workpiece 150. For example, controlled device 104 may include a torch (e.g., a welding torch, a cutting torch, and/or the like) associated with heating (e.g., for the purpose of welding or cutting) workpiece 150. In this example, tip 106 may be a torch nozzle that houses a contact tip of the torch. As another example, controlled device 104 may include a laser, in which case tip 106 may be an optical assembly from which a beam of light is emitted by the laser. As yet another example, controlled device 104 may include a sprayer (e.g., designed to spray water, an adhesive, a paint, and/or the like), in which case tip 106 may be a nozzle of the sprayer from which a fluid is provided. The above described examples of controlled device 104 are provided merely for illustrative purposes, and are not exhaustive. Generally, controlled device 104 may include any device having a tip 106 that is to be positioned relative to a workpiece 150 in association with performance of an operation on workpiece 150.

As further shown in FIG. 1, tip attachment 108 may be attached to tip 106 of controlled device 104. In some implementations, tip attachment 108 can be used in association with programming cobot 102 to position tip 106 of controlled device 104 during an operation on workpiece 150. In some implementations and as shown in the examples of FIGS. 2-15, tip attachment 108 includes an attachment body 110 with a recess 112 that fits on or in tip 106 of controlled device 104. A structure of attachment body 110 may define a set of angles of tip 106 during the programming of cobot 102. The set of angles may include, for example, a work angle (e.g., an angle of tip 106 relative to a surface of workpiece 150), a travel angle (e.g., an angle of tip 106 relative to a direction that cobot 102 is to move tip 106 during performance of the operation on workpiece 150), and/or the like. Further, a dimension of recess 112 may define a distance between tip 106 and workpiece 150 (i.e., a tip-to-workpiece distance) during programming of cobot 102.

In some implementations, tip attachment 108 may be used in association with programming of cobot 102 in a free-drive mode. For example, a user may attach tip attachment 108 to tip 106 and, while cobot 102 is in a free-drive mode, may move cobot 102 (thereby moving tip 106). Here, the structure of attachment body 110 of tip attachment 108 allows the user to move cobot 102 (by hand) such that tip 106 is positioned relative to workpiece 150 (e.g., in terms of a work angle, a travel angle, a distance from tip 106 to workpiece 150, and/or the like) with improved accuracy (e.g., as compared to positioning cobot 102/tip 106 in free-drive mode without use of tip 106). Example embodiments and additional details of tip attachment 108 are described below in association with FIGS. 2-15.

As indicated above, FIG. 1 is provided as an example. Other examples are possible and may differ from what was described in connection with FIG. 1.

Figure 2:
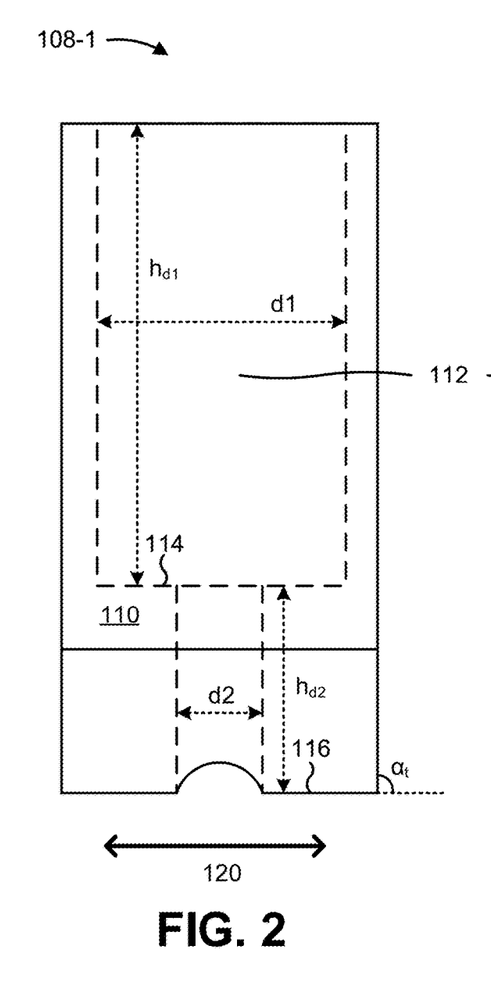
FIGS. 2-6 are diagrams of an example of a tip attachment associated with defining a position of a tip of a controlled device during programming a cobot, as described herein.
Figure 3:
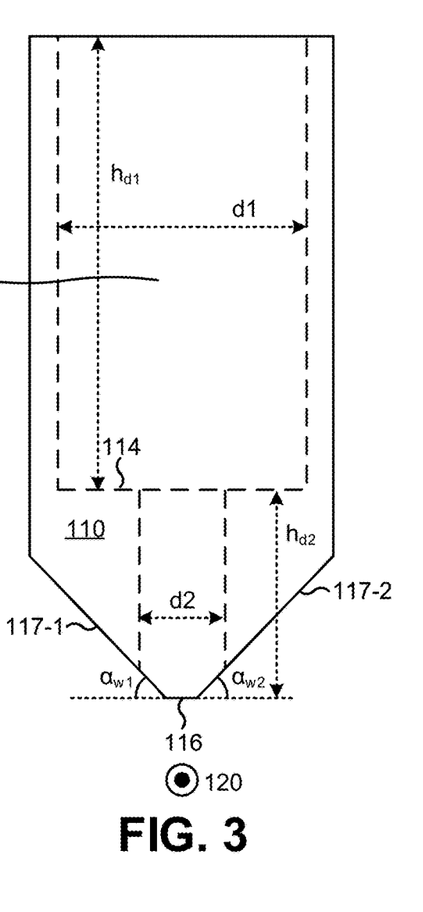
Figure 4:
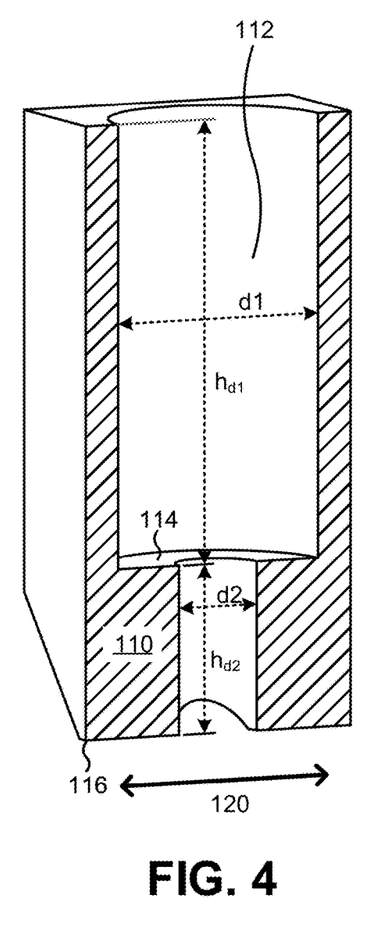
Figure 5:
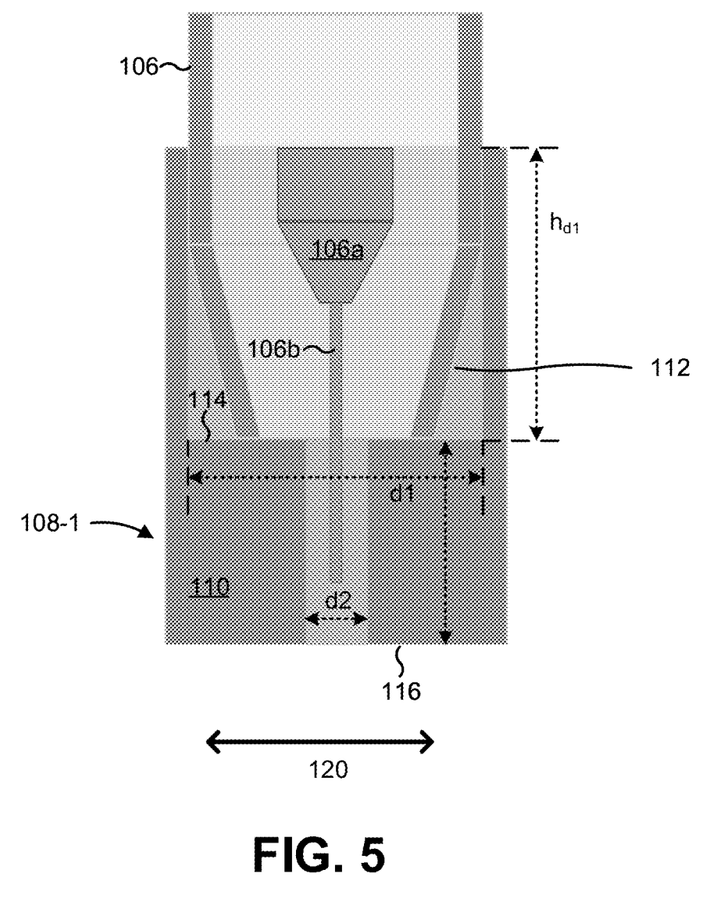
Figure 6:
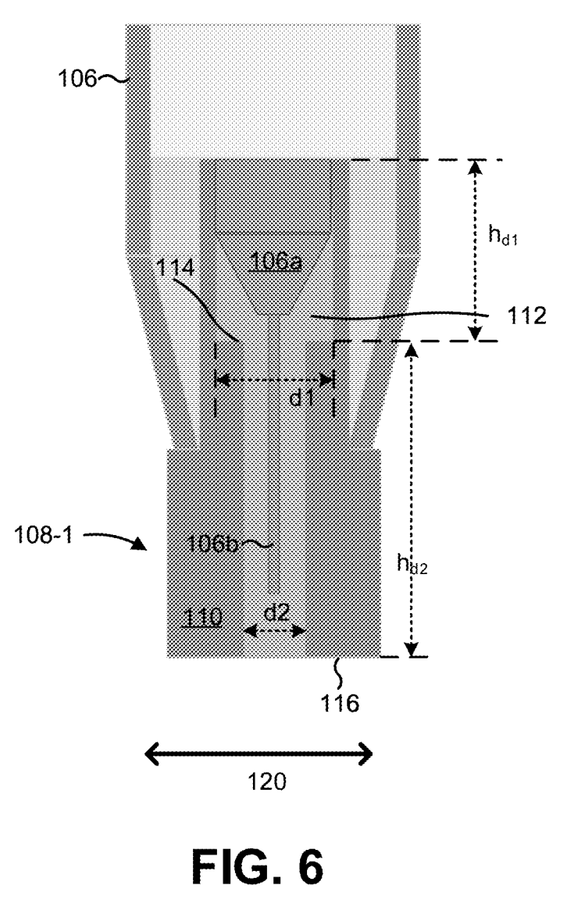

FIGS. 2-6 are diagrams of an example tip attachment 108 (herein referred to as tip attachment 108-1) associated with defining a position of tip 106 of controlled device 104 when programming cobot 102, as described herein. FIG. 2 shows a front view of tip attachment 108-1, FIG. 3 shows a side view of tip attachment 108-1, and FIG. 4 shows a cross-section of tip attachment 108-1 along a plane parallel to the front view shown in FIG. 2. FIGS. 5 and 6 show particular examples of tip attachment 108-1 in the context of a welding torch.

As shown in FIGS. 2-4, tip attachment 108-1 includes attachment body 110 with a recess 112. In some implementations, tip attachment 108 can be formed from a plastic material (e.g., a 3D-printable plastic), a metallic material, a glass material, an organic material, and/or another type of material.

Recess 112 includes a recess in attachment body 110 of tip attachment 108-1 that is designed to fit on or in tip 106 (e.g., such that tip attachment 108-1 is attached to tip 106). For example, as shown in FIG. 2, recess 112 may comprise a first portion (e.g., a first cylindrical-shaped portion) having a dimension d1 (d1>0) and a height $h_{d1}$, and (optionally) a second portion having a dimension d2 (d2<d1) and a height $h_{d2}$.

In some implementations, recess 112 may be sized such that tip attachment 108-1 fits over tip 106 (e.g., such that tip attachment 108-1 can slide on to tip 106 in order to attach tip attachment 108-1 to tip 106). For example, dimension d1 and height $h_{d1}$ can be sized such that tip 106 fits into the first portion of recess 112. Here, dimension d2 can be sized such that dimension d2 is smaller than a width of tip 106 in order to cause a recess surface 114 (e.g., a surface at a bottom of the first portion of recess 112) to prevent tip 106 from being further inserted into recess 112. In this example, attachment body 110 can be formed such that a distance between recess surface 114 and an end of tip attachment 108-1 (e.g., a distance corresponding to height $h_{d2}$) is a desired tip-to-workpiece distance associated with performing the operation on workpiece 150. Thus, by attaching tip attachment 108-1 to tip 106 and butting tip attachment 108-1 against workpiece 150 during programming of cobot 102, the distance between tip 106 and workpiece 150 can be accurately defined. A particular example of such a tip attachment 108-1 for a welding torch is shown in FIG. 5. As shown in FIG. 5, recess 112 is sized such that tip attachment 108 fits around tip 106 (e.g., such that a contact tip 106a and/or a welding wire 106b of the welding torch are at a particular distance from a bottom of surface 116 of attachment body 110, which will be butted against workpiece 150).

In some implementations, recess 112 may be sized such that tip attachment 108-1 fits within tip 106 (e.g., such that tip attachment 108-1 can slide in tip 106 in order to attach tip attachment 108-1 to tip 106). For example, dimension d1 and a width of a portion of attachment body 110 can be sized such that tip attachment 108 fits in to an opening of tip 106 and around a portion of tip 106 (e.g., a contact tip). Here, width of another attachment body can be sized such that tip 106 is prevented from being further inserted into recess 112. In this example, attachment body 110 can be formed such that a distance between recess surface 114 and an end of tip attachment 108-1 is a desired tip-to-workpiece distance associated with performing the operation on workpiece 150. Thus, by attaching tip attachment 108-1 to tip 106 and butting tip attachment 108-1 against workpiece 150 during programming of cobot 102, the distance between tip 106 and workpiece 150 can be accurately defined. A particular example of such a tip attachment 108-1 for a welding torch is shown in FIG. 6. As shown in FIG. 6, tip attachment 108 and recess 112 are sized such that tip attachment 108 fits in an opening of tip 106 and around contact tip 106a of the welding torch (e.g., such that contact tip 106a and/or welding wire 106b are at a particular distance from a bottom of surface 116 of attachment body 110, which will be butted against workpiece 150).

Returning to FIG. 2, in some implementations, attachment body 110 can be structured such that a structure of an end of attachment body 110 defines the set of angles of tip 106 during programming of cobot 102. For example, as shown in FIGS. 2-4, attachment body 110 may be structured to include a prism-shaped structure at an end of attachment body 110 (e.g., an end of tip attachment 108-1 that is to be butted against workpiece 150 during programming of cobot 102). In such a case, the prism-shaped structure may define a travel angle of tip 106 and a work angle of tip 106.

With regard to the travel angle of tip 106, a bottom surface 116 of attachment body 110 can be formed such that bottom surface 116 is at a particular angle with respect to a plane of recess surface 114. For example, if attachment body 110 is formed such that bottom surface 116 is at a 180° angle with respect to (i.e., parallel to) recess surface 114, and a direction of movement 120 (e.g., a direction that cobot 102 is to move tip 106 during operation on workpiece 150) is as indicated (e.g., parallel to the front view shown in FIG. 2 and perpendicular to the side view shown in FIG. 3), then the travel angle $\alpha_t$ defined by tip attachment 108-1 is approximately equal to 90° (as noted in FIG. 2).

With regard to the work angle of tip 106, one or more surfaces 117 of attachment body 110 can be formed such that the one or more angled surfaces 117 are at respective particular angles with respect to a plane of recess surface 114. For example, as shown in FIGS. 2-4, if attachment body 110 is formed such that angled surface 117-1 is at a 45° angle with respect to recess surface 114 and such that angled surface 117-2 is at a 45° angle with respect to recess surface 114, and direction of movement 120 is as indicated, then work angle $\alpha_{w1}$ and work angle $\alpha_{w2}$ defined by tip attachment 108-1 are both approximately equal to 45° (as shown in FIG. 3). In some implementations, attachment body 110 may be formed such that work angle $\alpha_{w1}$ differs from work angle $\alpha_{w2}$ (e.g., in order to allow a single tip attachment 108-1 to be used to define different work angles by appropriately rotating tip attachment 108-1 on tip 106).

As indicated above, tip attachment 108-1 shown in FIGS. 2-6 is provided as an illustrative example. The characteristics (e.g., orientation, dimensions, arrangement, shape, and/or the like), of attachment body 110 and recess 112 shown in FIGS. 2-6 are provided as illustrative examples. In practice, attachment body 110 and/or recess 112 may have additional characteristics and/or different characteristics than those shown in FIGS. 2-6.

Figure 7:
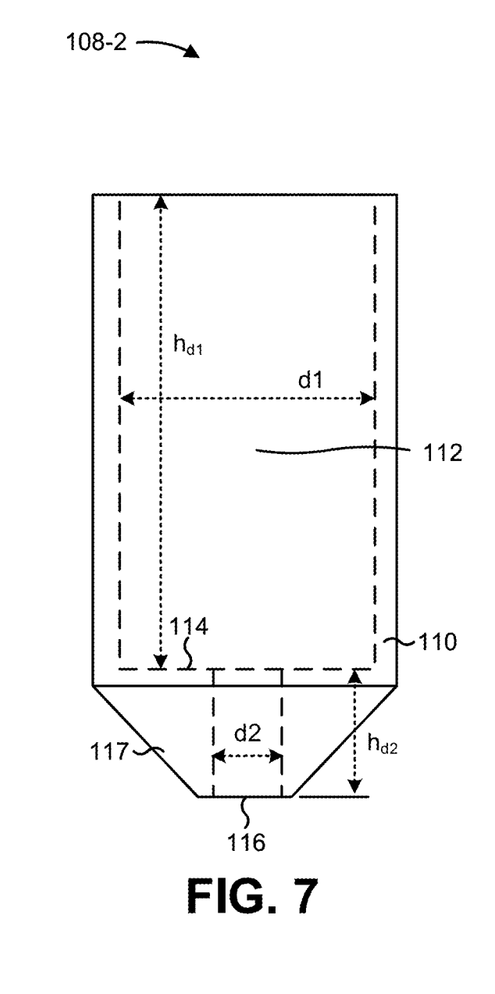
FIGS. 7-9 are diagrams of another example tip attachment associated with defining a position of a tip of a controlled device when programming a cobot, as described herein.
Figure 8:
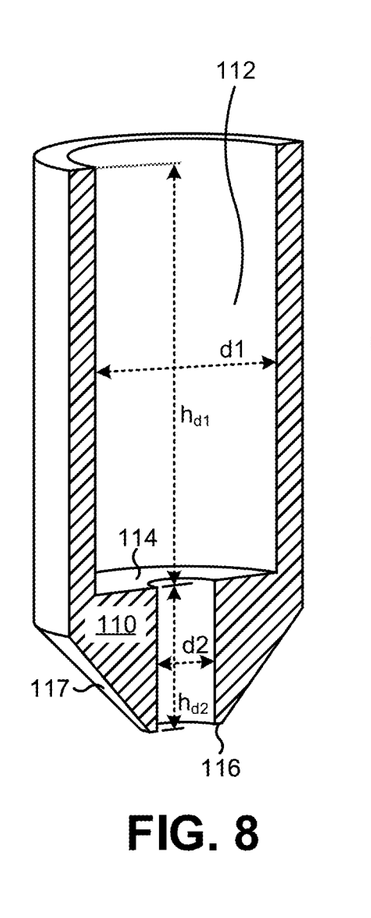
Figure 9:
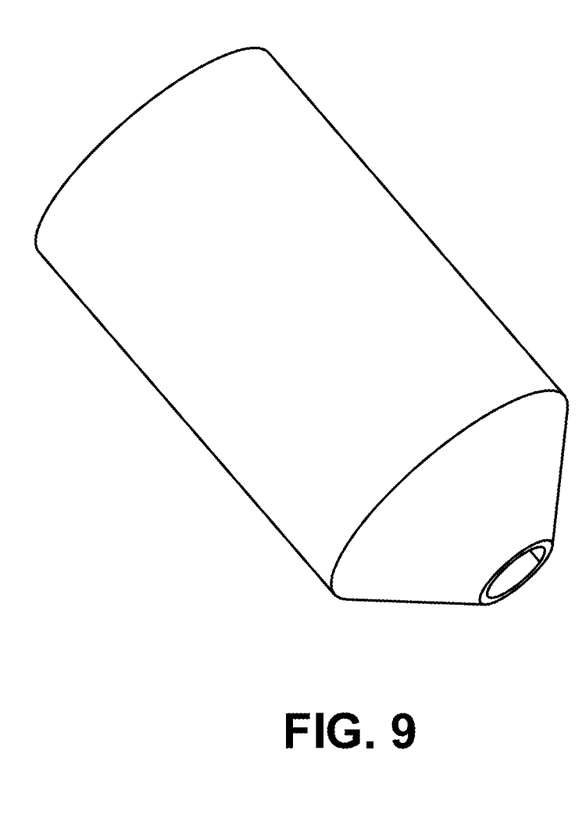

FIGS. 7-9 are diagrams of another example of tip attachment 108 (herein referred to as tip attachment 108-2) associated with defining a position of tip 106 of controlled device 104 when programming cobot 102, as described herein. FIG. 7 shows a front/side view of the example tip attachment 108-2, FIG. 8 shows a cross-section of the example tip attachment 108-2 along a plane across the front/side view shown in FIG. 7, and FIG. 9 shows an isometric view of the example tip attachment 108-2.

As shown in FIGS. 7 and 8, tip attachment 108-2 includes attachment body 110 with a recess 112. In some implementations, recess 112 may be similar to that described above in association with FIGS. 2-6.

As further shown, attachment body 110 of tip attachment 108-2 can be structured such that a structure of an end of attachment body 110 defines the set of angles of tip 106 during programming of cobot 102. For example, as shown in FIGS. 7-9, attachment body 110 may be structured to include a conical-shaped structure at an end of attachment body 110 (e.g., an end of tip attachment 108-1 that is to be butted against workpiece 150 during programming of cobot 102). In such a case, the conical-shaped structure may define a travel angle of tip 106 and a work angle of tip 106.

With regard to the travel angle of tip 106, a bottom surface 116 of attachment body 110 can be formed such that bottom surface 116 is at a particular angle with respect to a plane of recess surface 114. For example, if attachment body 110 is formed such that bottom surface 116 is at a 180° angle with respect to (i.e., parallel to) recess surface 114, then the travel angle $\alpha_t$ defined by tip attachment 108-2 is approximately equal to 90°, as described above.

With regard to the work angle of tip 106, an angled surface 117 (e.g., a surface formed by the conical portion of attachment body 110) can be formed such that angled surface 117 is at a respective particular angle with respect to a plane of recess surface 114. For example, if attachment body 110 is formed such that angled surface 117 is at a 45° angle with respect to recess surface 114, then work angle $\alpha_w$ defined by tip attachment 108-2 is approximately equal to 45°.

As indicated above, tip attachment 108-2 shown in FIGS. 7-9 is provided as an illustrative example. The characteristics (e.g., orientation, dimensions, arrangement, shape, and/or the like), of attachment body 110 and recess 112 shown in FIGS. 7-9 are provided as illustrative examples. In practice, attachment body 110 and/or recess 112 may have additional characteristics and/or different characteristics than those shown in FIGS. 7-9.

FIGS. 10-15 are diagrams of additional example tip attachments 108 associated with defining a position of tip 106 of controlled device 104 when programming cobot 102, as described herein.

Figure 10:
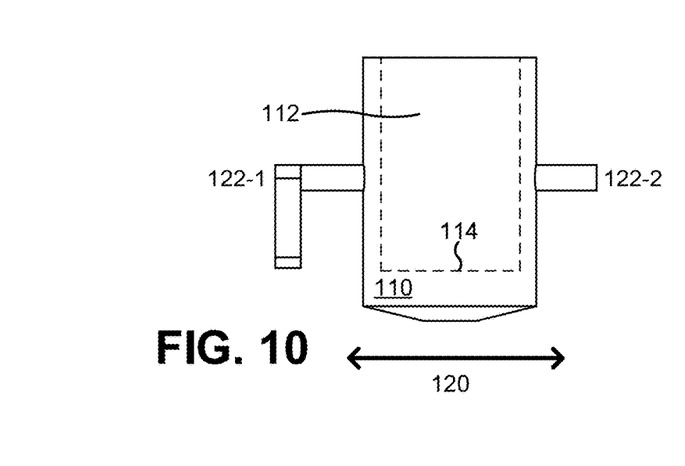
FIGS. 10-15 are diagrams of additional example tip attachments associated with defining a position of a tip of a controlled device when programming a cobot, as described herein.
Figure 11:
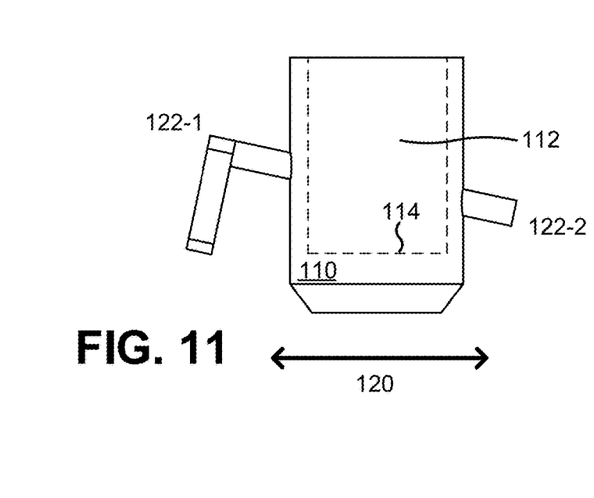
Figure 12:
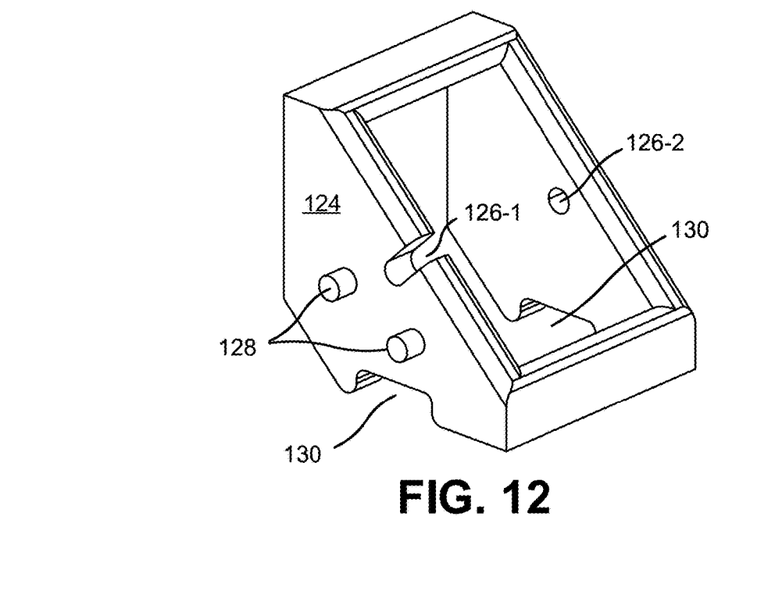
Figure 13:
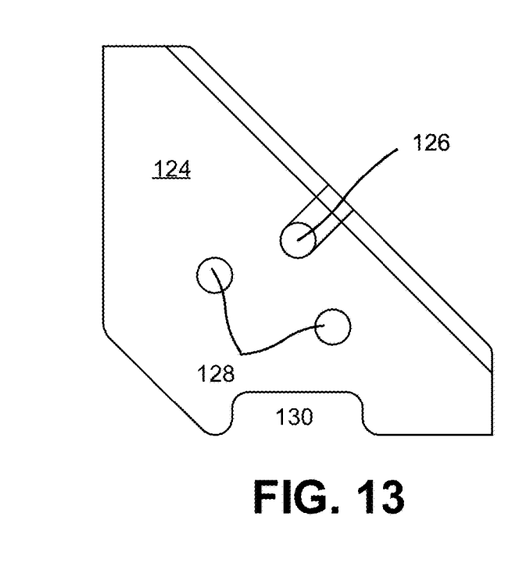
Figure 14:
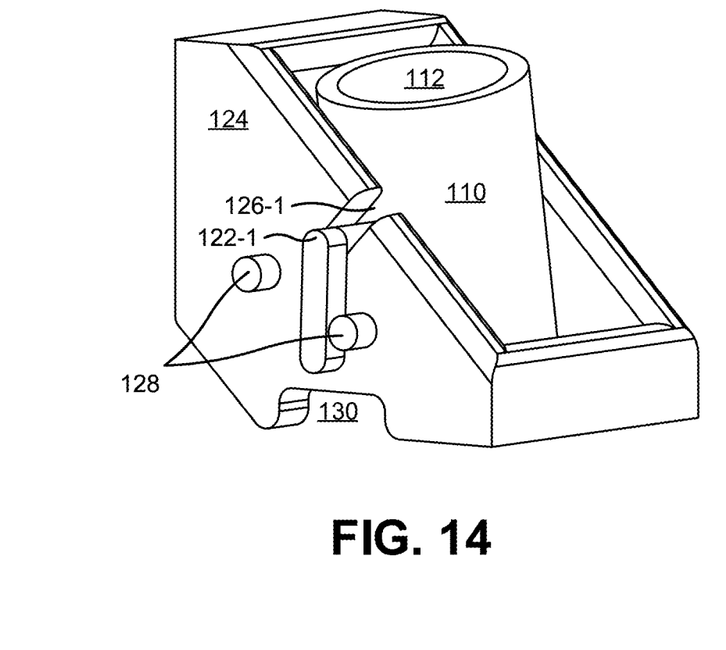
Figure 15:
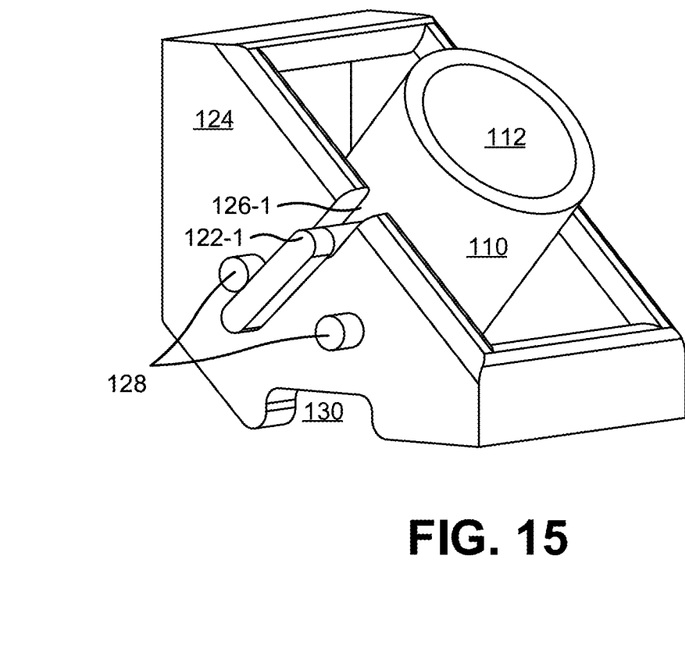

In some implementations, as shown in FIGS. 10 and 11, attachment body 110 may include a set of arms 122 (e.g., arm 122-1 and arm 122-2) extending from (e.g., an outer surface of) attachment body 110. In such a case and as shown in FIGS. 12 and 13, tip attachment 108 may further include a base frame 124 including a set of slots 126 (e.g., slot 126-1 and slot 126-2). An isometric view of an example of such a base frame 124 is shown in FIG. 12, and a side view of the example of the base frame 124 is shown in FIG. 13. In some implementations, each of the set of arms 122 can be inserted in a respective slot 126 (e.g., such that attachment body 110 is arranged with base frame 124), examples which are shown in FIGS. 14 and 15.

In some implementations, an angle of the set of arms 122 relative to recess surface 114 of recess 112 may define a travel angle of tip 106 during programming of cobot 102 (e.g., when attachment body 110 is placed in base frame 124).

For example, if arms 122-1 and 122-2 are formed such that arms 122-1 and 122-2 are substantially parallel to recess surface 114 (e.g., as illustrated in FIG. 10, and a direction of movement 120 is as indicated, then the travel angle $\alpha_t$ defined by tip attachment 108 (when arms 122-1 and 122-2 of attachment body 110 are placed in slots 126-1 and 126-2, respectively, of base frame 124) is approximately equal to 90°. As another example, if arms 122-1 and 122-2 are formed such that arms 122-1 and 122-2 are angled at approximately 150 with respect to recess surface 114 (e.g., as illustrated in FIG. 11), and a direction of movement 120 is as indicated, then the travel angle $\alpha_t$ defined by tip attachment 108 (when arms 122-1 and 122-2 of attachment body 110 are place in slots 126-1 and 126-2, respectively, of base frame 124) is approximately equal to 75°.

In some implementations, base frame 124 may include a set of pegs 128 that allow the work angle of tip 106 to be selected. For example, as illustrated in FIGS. 14 and 15, when attachment body 110 is arranged in base frame 124, a portion of arm 122-1 is between pegs 128 of base frame 124. Here, attachment body 110 may be rotated with base frame 124 in order to select a particular work angle of tip 106. For example, when attachment body 110 is positioned as illustrated in FIG. 14, the work angle of tip 106 may be approximately 900. Continuing with this example, when attachment body 110 is positioned as illustrated in FIG. 15, the work angle of tip 106 may be approximately 450. In some implementations, base frame 124 may include a different number of pegs, removable pegs, adjustable pegs, and/or the like, such that more than two work angles can be provided by tip attachment 108.

In some implementations, as shown in FIGS. 12-15, base frame 124 may include openings 130 that allow base frame 124 to slide over an existing feature of workpiece 150 (e.g., a pre-existing weld) during programming of cobot 102.

As indicated above, tip attachments 108 with base frame 124 shown in FIGS. 10-15 are provided as illustrative examples. The characteristics (e.g., orientation, dimensions, arrangement, shape, and/or the like), of attachment body 110, recess 112, arms 122, slots 126, pegs 128, and openings 130 shown in FIGS. 10-15 are provided as illustrative examples. In practice, attachment body 110, recess 112, arms 122, slots 126, pegs 128, and/or openings 130 may have additional characteristics and/or different characteristics than those shown in FIGS. 10-15.

INDUSTRIAL APPLICABILITY

As described above, programming cobot 102 in a free-drive mode may lead to inaccurate positional programming of cobot 102, which can be a significant concern in some applications. The disclosed tip attachment 108 may be used to increase positional accuracy in association with programming cobot 102 (or any robotic device) that is to control a position of a tip 106 of controlled device 104 during performance of an operation on a workpiece 150. For example, the tip attachment 108 may be used to increase positional accuracy in association with programming a cobot 102 that is to control a position of contact tip of a welding torch during a weld performed on a workpiece, a cobot 102 that is to control a position of contact tip of a cutting torch during a cut performed on a workpiece, a cobot 102 that is to control a position of an optical assembly from which a beam of light is emitted by a laser, a cobot 102 that is to control a nozzle of a sprayer during an application of a material on a workpiece, and/or the like.

In some implementations, as described above, tip attachment 108 is attached to tip 106 during programming of cobot 102 in the free-drive mode. After tip attachment 108 is attached to tip 106, cobot 102 can be moved (by hand) into a position relative to workpiece 150. Here, by butting tip attachment 108 against workpiece 150, a distance between tip 106 and workpiece 150, a work angle of tip 106, and a travel angle of tip 106 can be defined by tip attachment 108. Of course, tip attachment 108 can be designed to provide a desired tip-to-workpiece distance, a desired work angle, and a desired travel angle when tip attachment 108 is butted against workpiece 150. Thus, after moving cobot 102 into position (e.g., such that tip attachment 108 butts against workpiece 150), accurate positioning (e.g., in terms of tip-to-workpiece distance, work angle, travel angle, and/or the like) is achieved. In some implementations, multiple different tip attachments 108 can be interchangeably used throughout the programming of cobot 102. Further, in some cases, a single tip attachment 108 can be used to provide different positional angles, as described above.

A number of advantages may be associated with the disclosed tip attachment 108. For example, the use of tip attachment 108 may provide increased positional accuracy when programming cobot 102 (e.g., as compared to programming cobot 102 in free-drive mode without tip attachment 108). Furthermore, the use of tip attachment 108 during programming of cobot 102 may simplify the programming of cobot 102 and/or reduce an amount of time needed to program cobot 102 (e.g., as compared to using a teach pendant or a combination of a teach pendant and programming in the free-drive mode).

What is claimed is:

1. A torch attachment, comprising:
    an attachment body including a recess to fit on or in a tip of a torch during programming of a collaborative robot,
        wherein a structure of the attachment body defines a set of angles of the tip during the programming of the collaborative robot, and
        wherein a dimension of the recess defines a distance between the tip and a workpiece during the programming of the collaborative robot.

2. The torch attachment of claim 1, wherein the set of angles defined by the structure of the attachment body includes a work angle of the tip and a travel angle of the tip.

3. The torch attachment of claim 1, wherein the structure of the attachment body that defines the set of angles is a prism-shaped structure at an end of the attachment body.

4. The torch attachment of claim 1, wherein the structure of the attachment body that defines the set of angles is a conical-shaped structure at an end of the attachment body.

5. The torch attachment of claim 1, wherein the torch attachment is used to during programming of the collaborative robot in a free-drive mode.

6. The torch attachment of claim 1, wherein the structure that defines the set of angles includes a set of arms, and
wherein the torch attachment further comprises:
a base frame including a set of slots,
wherein each of the set of arms is inserted in a respective slot of the set of slots in association with defining at least one of the set of angles during the programming of the collaborative robot.

7. The torch attachment of claim 6, wherein one of the set of angles of the tip is defined by an angle of the set of arms relative to a surface of the recess.

8. The torch attachment of claim 6, wherein the base frame includes a set of pegs that allow one of the set of angles of the tip to be selected.

9. A tip attachment, comprising:
an attachment body including a recess to fit on or in a tip of a device during programming of a robotic device,
wherein the attachment body is structured such that the attachment body defines a set of angles of the tip during the programming of the robotic device, and
wherein the recess is sized such that the recess defines a distance between the tip and a workpiece during the programming of the robotic device.

10. The tip attachment of claim 9, wherein the set of angles includes a work angle of the tip and a travel angle of the tip.

11. The tip attachment of claim 9, wherein the attachment body is structured such that a prism-shaped structure at an end of the attachment body defines the set of angles.

12. The tip attachment of claim 9, wherein the attachment body is structured such that a conical-shaped structure at an end of the attachment body defines the set of angles.

13. The tip attachment of claim 9, wherein the tip attachment is used to during programming of the robotic device in a free-drive mode.

14. The tip attachment of claim 9, wherein the attachment body includes a set of arms, and
wherein the tip attachment further comprises:
a base frame including a set of slots,
wherein each of the set of arms is inserted in a respective slot of the set of slots in association with defining at least one of the set of angles during the programming of the robotic device.

15. The tip attachment of claim 14, wherein one of the set of angles of the tip is defined by an angle of the set of arms relative to a surface of the recess.

16. The tip attachment of claim 14, wherein the base frame includes a set of pegs that allow one of the set of angles of the tip to be selected.

17. A system, comprising:
a robotic device;
a device associated with performing an operation on a workpiece,
wherein the robotic device is to position a tip of the device during a performance of the operation on the workpiece; and
a tip attachment, attached to the tip of the device, comprising an attachment body with a recess that fits on or in the tip of the device,
wherein a structure of the attachment body defines a set of angles of the tip during programming of the robotic device to perform the operation, and
wherein a dimension of the recess defines a distance between the tip and the workpiece during the programming of the robotic device to perform the operation.

18. The system of claim 17, wherein the structure of the attachment body that defines the set of angles includes an angled surface of the attachment body.

19. The system of claim 17, wherein the tip attachment is used to during programming of the robotic device in a free-drive mode.

20. The system of claim 17, wherein the attachment body includes a set of arms, and
wherein the tip attachment further comprises a base frame including a set of slots,
wherein each of the set of arms is inserted in a respective slot of the set of slots in association with defining at least one of the set of angles during the programming of the robotic device.

* * * * *